3 Sheets—Sheet 1

C. M. RYDER.
DEVICES FOR TESTING CARBONIZATION OF METALS.

No. 185,647. Patented Dec. 26, 1876.

WITNESSES
A. W. Bright.
F. V. McCleary

INVENTOR
Chas. M. Ryder,
By Leggett & Leggett

THE GRAPHIC CO. N.Y.

C. M. RYDER.
DEVICES FOR TESTING CARBONIZATION OF METALS.

No. 185,647. Patented Dec. 26, 1876.

3 Sheets—Sheet 2.

WITNESSES

INVENTOR

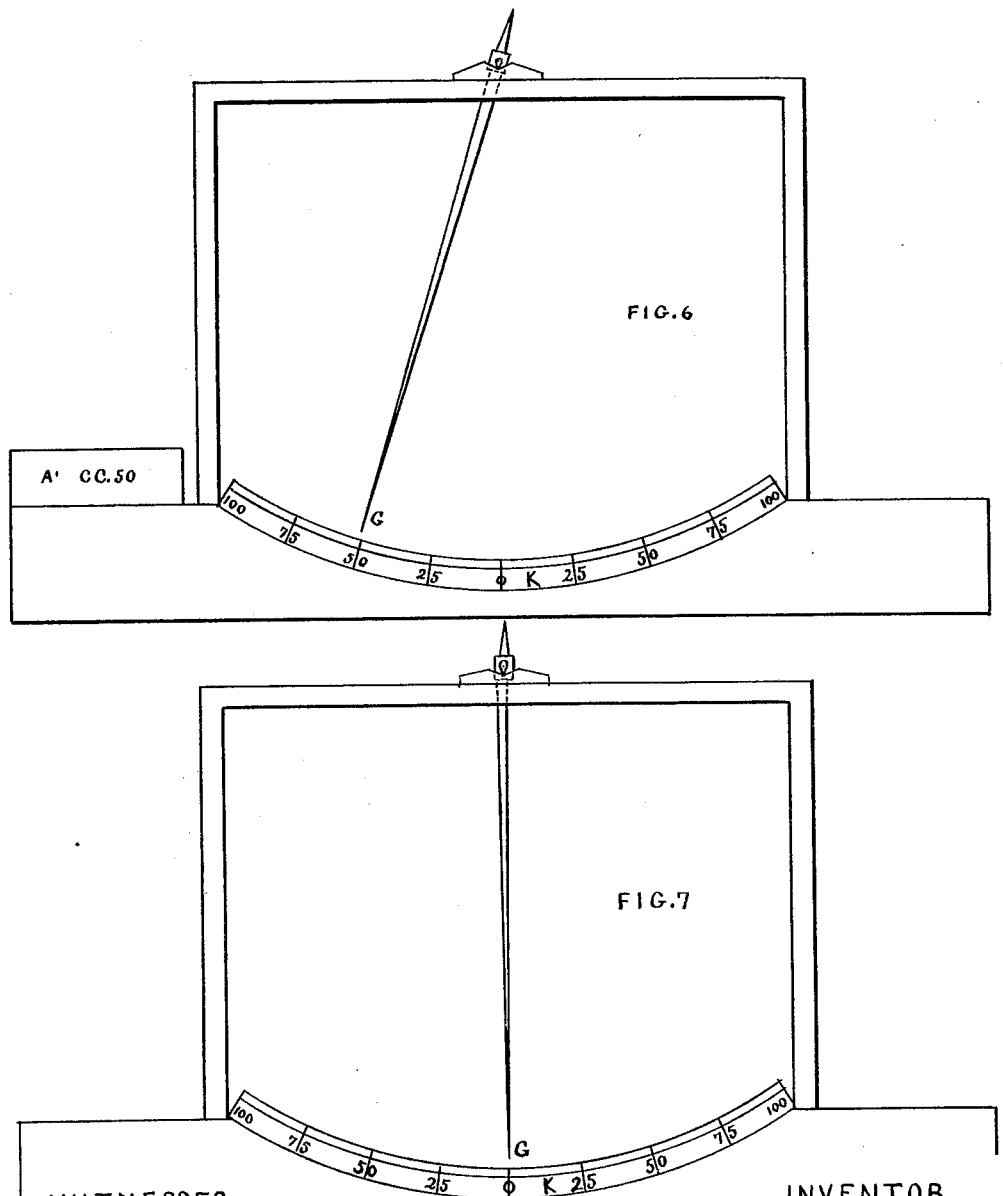

UNITED STATES PATENT OFFICE.

CHARLES M. RYDER, OF CLEVELAND, OHIO, ASSIGNOR TO HIMSELF AND SAMUEL T. WELLMAN, OF SAME PLACE.

IMPROVEMENT IN DEVICES FOR TESTING CARBONIZATION OF METALS.

Specification forming part of Letters Patent No. 185,647, dated December 26, 1876; application filed August 30, 1876.

*To all whom it may concern:*

Be it known that I, CHARLES M. RYDER, of Cleveland, in the county of Cuyahoga, and State of Ohio, have invented certain new and useful Improvements in Device for Testing Carbonization of Metals; and I do hereby declare the following to be a full, clear, and exact description of the invention, such as will enable others skilled in the art to which it pertains to make and use it, reference being had to the accompanying drawings, which form part of this specification.

My invention relates to mechanical means for determining the percentage of carbon that exists in any given sample of iron or steel.

My invention consists in the combination of devices and appliances, as herein set forth and claimed.

Figure 1:
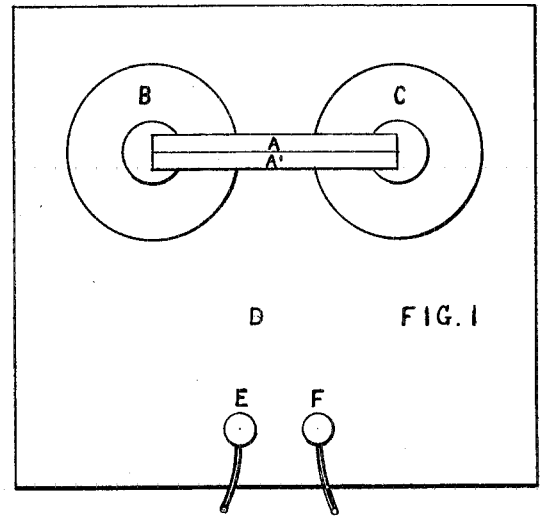
Figure 2:
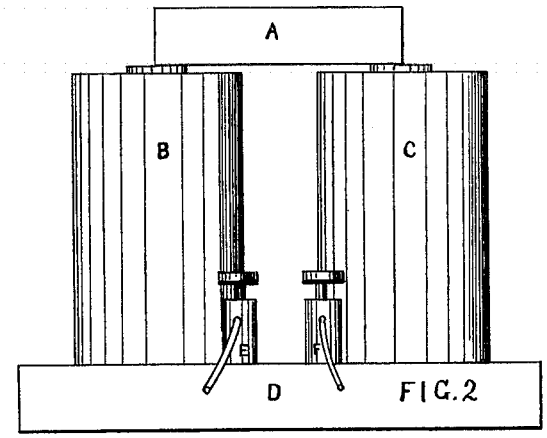
Figure 3:
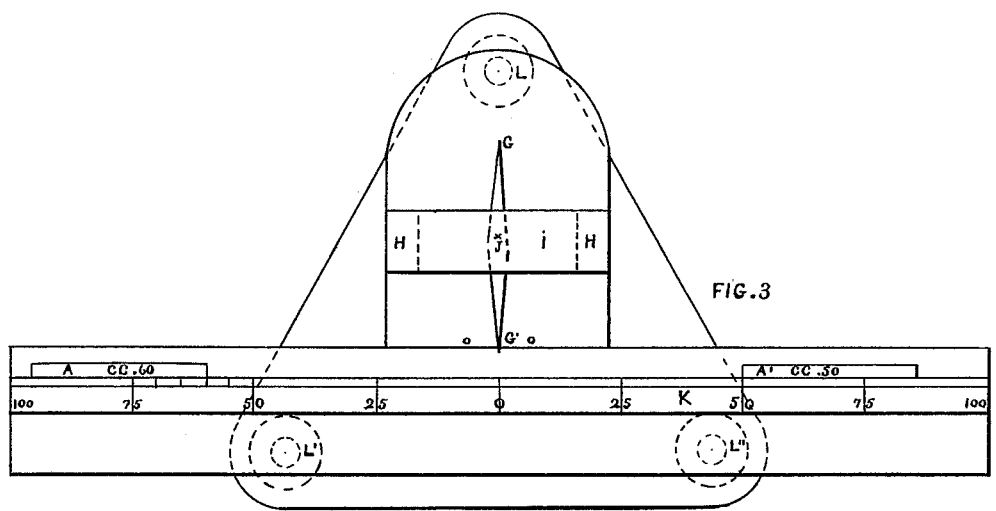
Figure 4:
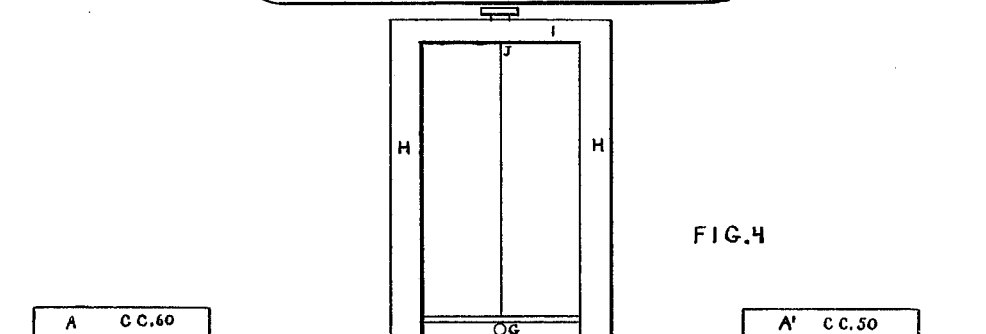
Figure 5:
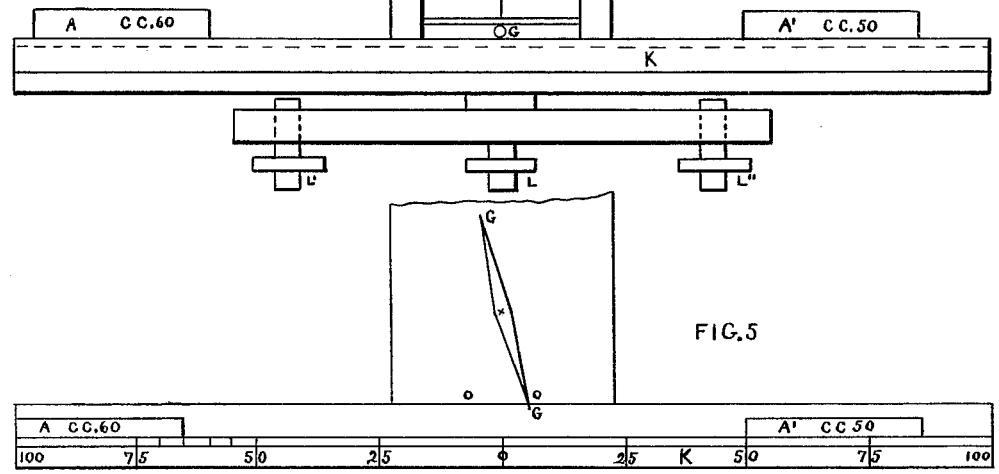

In the drawing, Figure 1, Sheet 1, represents a plan view of an electro-magnet for magnetizing the pieces of metal; Fig. 2, Sheet 1, an elevation of same; Fig. 3, Sheet 2, a view, in elevation, of an apparatus embodying my invention. Fig. 4, Sheet 2, is a view, in elevation, of the same machine. Fig. 5, Sheet 2, represents the machine before the pieces have been properly adjusted upon the scale, indicating a variation of the needle. Fig. 6, Sheet 3, is a modification of my invention.

A is a piece of steel, or of homogeneous iron or other ferruginous product, which has a given or ascertained amount or percentage of carbon. A' is a piece of similar metal, the percentage of carbon of which is not known, but is to be ascertained. The piece A' of metal is taken either from the furnace during the process of conversion, or from the finished product, as is desired. The two pieces A A' are then first tested by a needle to ascertain whether it has magnets, which is shown by its attraction to one pole, and a repulsion of the other pole. If neutral, it attracts either pole equally well. If found to be neutral, it is placed side by side with piece A, of known carbonization, on the poles of an electro-magnet, as shown in Fig. 1, Sheet 1, B C. The magnet is then connected with a galvanic battery, thus permanently magnetizing the pieces A A'. They are then removed from the poles of the battery and placed upon an indicator, as shown in Fig. 3, Sheet 2.

This indicator consists of a scale graded in both directions from the zero or central point. Opposite the zero or central point is suspended the needle G, that in the drawing being represented suspended from a point, J, above. It is, as above stated, hung so that its central or pivotal point shall be immediately opposite the zero-point on the scale K.

The piece A, which has a known carbonization, is placed at its corresponding point on the scale. Thus, if it is known that the piece A has one-half of one per cent. of carbon, it is placed so that its end shall be, as indicated, opposite the number .50. The piece A', the percentage of which is to be ascertained, is placed at the other end of the scale. These two pieces will then exert an influence upon the needle, causing it to come to an equilibrium at some point, as, for instance, as shown in Fig. 5, varying from the zero-point. The piece A' is then slid along the scale K until, by its approach toward the needle, its point G will be brought to an equilibrium immediately opposite the zero-point of the scale. The end of the piece A' will then rest opposite an indication on the scale which represents its exact percentage of carbon. Thus the piece A', as shown in Fig. 3, would possess sixty one-hundredths of one per cent. carbon.

In this way, having a piece of metal of given or known percentage of carbon, this machine furnishes a mechanical means for immediately determining the exact percentage of carbon that exists in any other piece of metal.

In Fig. 4 this device is represented in elevation, the apparatus H H supporting the crosspiece I, from which the needle G G' is suspended, and L L¹ L² represent adjustments, by which the device may be brought to a level.

It is apparent that the construction here shown is but one of many that may be adopted, and that will operate upon substantially the same principle. Thus the needle, instead of being suspended from above, might be supported from beneath, and instead of being a horizontal needle, it might be a vertical needle pivoted upon a horizontal axis.

The essential feature of my invention consists, however, in the employment of a needle in connection with a graded scale and the pieces of metal, the percentage of carbon in one of which is known, these several elements being so placed in relation to each other that the relative attractions of the needle by the pieces A A' shall indicate the percentage of carbon in the unknown piece; and it is apparent that this may be done either by sliding the unknown piece toward the needle until the needle shall rest at the zero-point, in which case the piece itself would mark its percentage of carbon by its position on the scale K, or it might be ascertained by fixing the unknown piece at the same distance from the needle that the known piece is fixed, and the needle, by its superior attraction toward either piece, might, when at equilibrium, point upon a suitable scale to the figures indicating the percentage of carbon in the unknown piece.

It is also apparent that I am not limited to any particular means for magnetizing the pieces A A'. They may be magnetized in any suitable manner; but in order that they may be uniformly magnetized, and to an equal degree, the method here shown is believed to be as good as any.

Another modification of which my invention is capable without a departure from its principle or intent is shown in Fig. 6, Sheet 3, of the drawings. In this instance the needle or indicator is swung loosely upon the pivot, and at its point is placed a suitable graduated scale, so marked as to indicate different percentages of carbon. In this instance but one piece of metal is employed—viz., the piece to be tested. This is preferably made at all times of a given or standard size, and should be placed at all times at a uniform distance from the neutral or perpendicular position of the needle or indicator. The degree of attraction exerted by the piece of metal to be tested (the same having been previously magnetized) upon the needle or indicator can indicate the percentage of carbon in said piece of metal, which percentage can be read from the scale above mentioned. In this modification the two pieces of metal—to wit, the piece of unknown carbonization and of known carbonization—are dispensed with, and only the piece of unknown carbonization, or the piece to be tested, is employed.

What I claim is—

1. A mechanical means for determining the percentage of carbon in ferruginous metals, consisting of a pointer, A, two equal reversed scales on opposite sides of the pointer, one for the piece of unknown percentage of carbon, the other for the piece of known carbonization, said scales being graduated to the different percentages of carbon, and having their common zero-point immediately beneath the pointer when unattracted, substantially as set forth.

2. A mechanical means for determining the percentage of carbon in ferruginous metals, consisting of a pointer and scale graduated to the percentages of carbon, whereby metals placed on opposite sides of the needle, at equal distance therefrom, will, by their varying attraction of the needle, cause it to point on the scale to the percentage of carbon that exists in the unknown pieces, substantially as set forth.

In testimony whereof I have signed my name to this specification in the presence of two subscribing witnesses.

CHARLES M. RYDER.

Witnesses:
  FRANCIS TOUMEY,
  WM. BEHRENS.